(12) United States Patent
Dawson et al.

(10) Patent No.: US 9,927,266 B2
(45) Date of Patent: Mar. 27, 2018

(54) MULTI-CHIP DEVICE WITH TEMPERATURE CONTROL ELEMENT FOR TEMPERATURE CALIBRATION

(75) Inventors: Chad S. Dawson, Queen Creek, AZ (US); Phillipe Lance, Toulouse (FR); Yizhen Lin, Gilbert, AZ (US); Mark E. Schlarmann, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 743 days.

(21) Appl. No.: 13/511,974

(22) PCT Filed: Feb. 27, 2012

(86) PCT No.: PCT/IB2012/000510
§ 371 (c)(1),
(2), (4) Date: Sep. 11, 2014

(65) Prior Publication Data
US 2014/0376586 A1  Dec. 25, 2014

(51) Int. Cl.
*G01K 15/00* (2006.01)
*G01K 7/00* (2006.01)
*G01D 18/00* (2006.01)
*G01D 3/036* (2006.01)

(52) U.S. Cl.
CPC ........... *G01D 18/00* (2013.01); *G01D 3/0365* (2013.01)

(58) Field of Classification Search
USPC ............................. 374/1, 163, 166; 327/512
See application file for complete search history.

(56) References Cited

U.S. PATENT DOCUMENTS

| | | | |
|---|---|---|---|
| 4,463,274 A | 7/1984 | Swartz | |
| 5,477,417 A * | 12/1995 | Ohmori | G06F 1/206 327/512 |
| 7,800,457 B2 | 9/2010 | Unkrich et al. | |
| 8,988,115 B2 * | 3/2015 | Kim | H03K 3/011 327/262 |
| 9,006,857 B1 * | 4/2015 | Carr | H01L 27/14601 257/12 |
| 2003/0214998 A1 * | 11/2003 | Gauthier | G01K 15/00 374/141 |
| 2006/0097757 A1 * | 5/2006 | Gordon | G01K 15/00 327/77 |
| 2008/0001647 A1 * | 1/2008 | Moore | H01L 23/34 327/512 |
| 2008/0267258 A1 * | 10/2008 | Hokenmaier | G01K 7/425 374/166 |
| 2009/0021314 A1 * | 1/2009 | Boerstler | H03L 1/022 331/66 |
| 2009/0262776 A1 | 10/2009 | Limb et al. | |
| 2009/0322356 A1 | 12/2009 | Grudin et al. | |
| 2010/0231286 A1 * | 9/2010 | Kuusilinna | G01K 7/425 327/512 |

(Continued)

Primary Examiner — Mirellys Jagan

(57) ABSTRACT

A multi-die sensor system comprises a package and one or more transducer dies mounted in the package. Each transducer die includes one or more transducers, a temperature control element, and temperature sensor. The temperature control element changes the temperature of at least a portion of the transducer during operation of the temperature control element. A temperature sensor senses the temperature of at least the portion of the transducer. An output circuitry die mounted in the package receives transducer signals and a sensed temperature signal from the temperature sensor.

19 Claims, 2 Drawing Sheets

(56) References Cited

U.S. PATENT DOCUMENTS

| | | | | |
|---|---|---|---|---|
| 2010/0280788 A1* | 11/2010 | Bohan | ............... | F24F 11/001 |
| | | | | 702/130 |
| 2011/0132096 A1 | 6/2011 | Ricks | | |
| 2012/0224602 A1* | 9/2012 | Crafts | ............... | G01K 7/01 |
| | | | | 374/1 |
| 2013/0076381 A1* | 3/2013 | Takayanagi | ............ | G01K 3/005 |
| | | | | 324/750.03 |
| 2013/0261814 A1* | 10/2013 | Shrall | ............... | G06F 1/206 |
| | | | | 700/286 |
| 2014/0022002 A1* | 1/2014 | Chua-Eoan | ............ | H01L 23/34 |
| | | | | 327/512 |
| 2015/0117486 A1* | 4/2015 | Yang | ............... | G01K 15/005 |
| | | | | 374/1 |
| 2015/0369674 A1* | 12/2015 | Ma | ............... | G01K 15/005 |
| | | | | 374/1 |
| 2017/0257091 A1* | 9/2017 | Green | ............... | H03K 17/162 |

\* cited by examiner

MULTI-CHIP DEVICE WITH TEMPERATURE CONTROL ELEMENT FOR TEMPERATURE CALIBRATION

BACKGROUND

Field

This disclosure relates generally to semiconductor devices, and more specifically, to temperature calibration for semiconductor sensor systems.

Related Art

Many systems utilize sensors to monitor and/or control the operation of systems such as automobiles, aircraft, spacecraft, medical devices, and robots, among others. The sensors can be used to measure one or more variables such as pressure, temperature, speed, acceleration, motion, proximity, and so forth. Sensor outputs may then be used as feedback in a closed-loop control operation to ensure that the system is operated at the desired conditions, that operational bounds are observed, and that system performance is optimized. Technological advances have enabled many more sensors to be manufactured on a microscopic scale using microelectromechanical systems (MEMS) technology. MEMS technology combines microelectronics with miniaturized mechanical systems such as valves, gears, and any other component or components on a semiconductor chip using nanotechnology. Such microsensors can operate at significantly higher speeds and with greater sensitivity as compared to macroscopic designs.

Many sensor applications require smaller size and low cost packaging to meet aggressive cost targets. In addition, sensor applications are increasingly calling for tighter accuracy specifications, especially with regard to error due to temperature variation. Two commonly used metrics to express the temperature variation of a sensor are temperature coefficient of offset (TCO) and temperature coefficient of sensitivity (TCS). The term "offset" refers to the output deviation from its nominal value at the non-excited state of the MEMS sensor. Thus, TCO is a measure of how much thermal stresses affect the offset of a semiconductor device, such as a MEMS sensor. A high TCO indicates correspondingly high thermally induced stress, or a MEMS device that is very sensitive to such stress. The packaging of MEMS sensor applications often uses materials with dissimilar coefficients of thermal expansion. Thus, an undesirable TCO often develops during manufacture or operation. Even in the case of a perfectly stress-isolated package, there may still be a substantial TCO due to other factors. The term "sensitivity" refers to the ratio of output change for a given change at the input. Thus, TCS is a measure of how the gain of the sensor changes as temperature varies. Sensors commonly need to be individually calibrated to meet the TCS and TCO specifications. The cost associated with individualized temperature trim can be a significant portion of the overall calibration/test cost. A temperature compensation circuit can be included with a sensor system that utilizes a plurality of thermistors which vary the magnitude of the excitation voltage across a transducer to compensate for the undesirable changes in sensitivity with temperature. For example, a pressure transducer is basically a bridge circuit and the thermistors are connected from each input terminal of the bridge to a power supply line. The thermistors change the excitation voltage level so that the output voltage across the terminals of the bridge remain constant for a given change in pressure even though the temperature changes. The thermistors are shunted with temperature stable elements such as resistors to tailor the compensation characteristic.

The combination of resistors, thermistors, and transducer is adjusted by laser trimming through iterative operations over temperature to provide a device that provides accurate measurements over a range of temperatures. These adjustments can include sequential measurements over temperature and trimming. Individual resistive elements can also be trimmed to compensate for undesired temperature dependence of the transducer offset voltage. A complex procedure for trimming the resistors is also required. The gain of the circuit and the offset voltage of the transducer interact, requiring different pressures as well as temperatures for calibrating both gain and offset voltage.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein provide sensor systems with a heating element configured on the same die as a transducer and temperature sensor. The configuration and calibration techniques allow the sensor system to be tested and calibrated over a range of temperatures and pressures without requiring the sensor systems to be inserted and removed from environmental test chambers multiple times, as previously required with sensor systems in which the heater and temperature sensor is not included on the same die as the transducer. Time required to test and calibrate a sensor system is greatly reduced, thus increasing the number of devices that can be produced in a given amount of time and freeing up test resources for other uses.

Techniques disclosed herein allow the use of a heater resistor to trim at two different temperatures in a single insertion in a test chamber while the transducer and temperature sensor are located on the same semiconductor die so they are at the same temperature at the time of trim.

Additionally, sensor systems and techniques disclosed herein convert the analog signal from the sensor to a digital signal and accurately characterize the behavior of the digital signals with respect to the stimulus (i.e. pressure, acceleration etc. . . . ) the sensor is designed to measure. Due to the inherent temperature sensitivity of the sensor, data is taken at more than one temperature to fully characterize the device. Once this data is available, a controlling test system uses the data to calculate a transfer function that converts the raw digital sensor output to a calibrated value. The cost of calibrating the sensor system is decreased by only adding a temperature sensor to the die that includes the sensor. The digital temperature sensor reading is used along with the digital transducer reading, first to calculate transfer function coefficients during calibration, and then to calculate calibrated readings for the end user.

Figure 1:
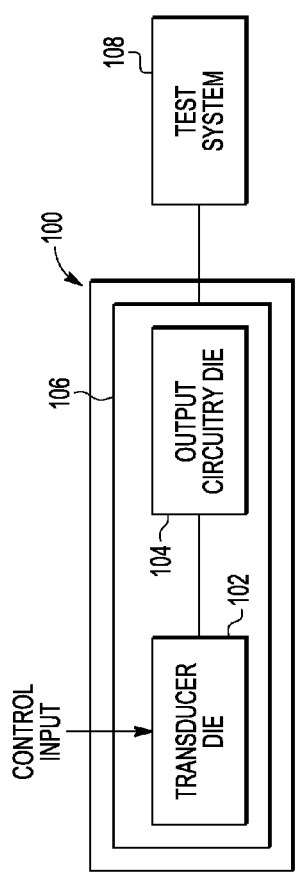
FIG. 1 shows a block diagram of an embodiment of a sensor system mounted in a single package.

FIG. 1 shows a block diagram of an embodiment of sensor system 100 mounted in a single package 106 including transducer die 102 coupled to communicate with output circuitry die 104 in package 106. Output circuitry die 104 receives an analog transducer output signal from transducer die 102. Package 106 is shown with only transducer die 102 and output circuitry die 104 for simplicity of illustration. Those skilled in the art will appreciate that package 106 can include many more components and functions. In some embodiments, sensor system 100 may be implemented within a microelectromechanical systems (MEMS) architecture. Thus, high performance sensors can be realized in a small form-factor at a low production cost. Although one embodiment of sensor system 100 is includes a MEMS structure, it should be appreciated by those skilled in the art that sensor system 100 may instead be implemented using other microscopic and macroscopic designs. Output circuitry die 104 can be implemented as an application specific integrated circuit (ASIC) including nonvolatile memory for data storage, or other suitable data processing components.

Package 106 can be included in numerous systems and devices in which one or more sensors are incorporated for monitoring and/or controlling the operation of the system/device. For example, package 106 can be included in an automobile, a machine, aerospace system, a medical device, a robotic device, and the like, and can be used to measure parameters such as pressure, temperature, speed, acceleration, motion, proximity, and so forth.

Additionally, test system 108 can be coupled to communicate with output circuitry die 104 and transducer die 102. For example, output circuitry die 104 can send data from a transducer and a temperature sensor to test system 108, and test system 108 can provide coefficients and/or offsets to output circuitry die 104 to correct data from the transducer. Tests system 108 is also capable of controlling auxiliary systems to provide stimulus required for calibration. For example, a pressure test system is capable of controlling a pressure supply to apply various known pressures to the device under test.

Figure 2:
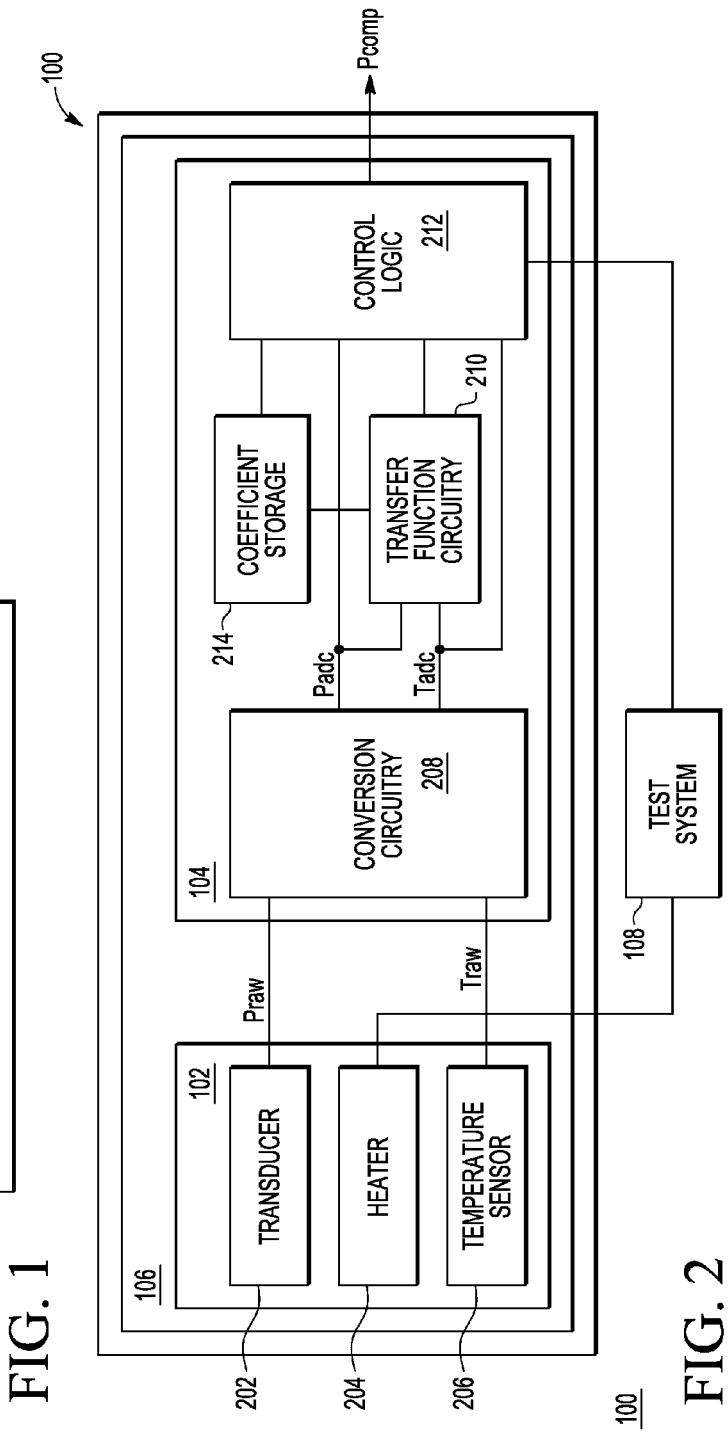
FIG. 2 shows a block diagram of components included in an embodiment of the sensor system of FIG. 1.

FIG. 2 shows a block diagram of components included in an embodiment of sensor system 100 that are typically mounted in a single package. Transducer die 102 includes transducer 202, temperature control element 204, and temperature sensor 206. Output circuitry die 104 is mounted in the package separate from transducer die 102 and is coupled to receive a raw transducer signal and raw temperature sensor signal from transducer die 102. These raw signals may be in (but are not limited to) the form of current, voltage, capacitance, resistance, etc. Output circuitry die 104 includes conversion circuitry 208 required to convert these raw signals to a useable format. The signal conditioning components in conversion circuitry 208 can include a current to voltage convertor, conversion circuit, amplifier, and/or analog to digital convertor. The input to the conversion circuitry 208 is an analog voltage proportional to pressure or temperature. The output of the conversion circuitry 208 is a digital value which is proportional to the input. One or more multiplexers may be used to perform conversion of multiple signals in series without requiring multiple hardware conversion circuitry 208. The conversion circuitry 208 may also include adjustable offset and gain settings. Further signal processing such as filtering and/or data formatting can also be performed by components of output circuitry die 104. Those skilled in the art will appreciate that output circuitry die 104 can include many more components and functions in addition to, or instead of, the components shown in FIG. 2 and described herein to condition the signals from transducer die 102.

The terms "module", "circuit", and "circuitry" are used interchangeably herein from a functional standpoint. Additionally, various functions performed by modules, circuits, and circuitry disclosed here can be implemented in hardware circuits, software program(s), firmware, or a combination of hardware, software program(s) and/or firmware.

In some embodiments, transducer 202 may be a pressure transducer for measuring a pressure parameter. Although sensor system 100 will be discussed in terms of sensing pressure, it should be appreciated by those skilled in the art that transducer 202 need not be a pressure transducer, but may alternatively be another device that converts one form of energy to another, such as a velocity sensor, an acceleration sensor, a motion sensor, a proximity sensor, and so forth. Sensor system 100 is particularly suited to devices with two or more die where temperature calibration is required for at least one of the die. Multiple transducer die 102 in the same package 106 can sense different parameters. For example, sensor system 100 can be used to calibrate both a pressure sensor and an accelerometer controlled by a third control die. Sensor system 100 can be extended to include as many separate sensor elements as desired.

Temperature control element 204 changes the temperature of at least a portion of transducer die 102 in the vicinity of transducer 202 during operation of the temperature control element 204. Temperature control element 204 can be configured to raise and/or lower the temperature of transducer die 206, depending on the type of component used to implement temperature control element 204. For example, temperature control element 204 can be implemented using one or more various circuit structures such as a resistor, diode, or other element that heats up when current flows through the element. The operation of temperature control element 204 can be controlled by an external control input, a control input from control circuitry 212, and/or test system 108. Control circuitry 212 can monitor the temperature of at least a portion of transducer die 206 to determine when the temperature reaches a steady state. In other embodiments, temperature control element 204 can be operated at a selected voltage for a selected period of time. The voltage and duration can be determined experimentally on a few sensor systems 100 and then used to calibrate subsequent sensor systems 100 having the same configuration. Temperature control element 204 can be formed during the process of forming other components and circuitry on die 102.

A series of tests, which may be called pressure tests, are performed with regard to transducer 202 to determine the relationship between Padc and Tadc. Padc data from transducer 202 and Tadc data from temperature sensor 206 may be taken at ambient temperature and provided to control circuitry 212. Temperature control element 204 may then be operated to increase the temperature of transducer 202. Padc data from transducer 202 at an elevated temperature along with a sensed temperature reading (Tadc) from temperature sensor 206 may be provided to control circuitry 212. Based on these tests, test system 108 determines a transfer function and provides coefficients and offsets to output circuitry die 104 for storage in coefficient storage 214. Transfer function circuitry 210 is designed according to the form of a transfer function so that only the coefficients and possibly a corresponding offset are needed in order to implement the desired transfer function.

Temperature sensor 206 is configured to sense the temperature of transducer die 102 and to provide the sensed temperature to calibrate sensor system 100. The temperature sensor 206 can be implemented in a variety of ways such as by a resistor, diode, or any other device or circuit capable of sensing temperature. In some embodiments, temperature control element 204 and temperature sensor 206 can be implemented using the same device. For example, the same resistor can be used for both temperature control element 204 and temperature sensor 206.

Transducer 202 senses raw input stimulus and provides a signal representative of the input stimulus to output circuitry die 104. For example, if transducer 202 is implemented as a pressure sensor, transducer 202 can include sensing elements (not shown) such as resistors coupled as a Wheatstone bridge so that a differential is established between the voltage at first and second nodes to indicate pressure. Transducer 202 outputs an analog voltage signal that is proportional to both applied pressure and temperature. Conversion circuitry 208 amplifies the pressure voltage signal, adds offset as needed, and converts the pressure voltage signal to a digital value (Padc). In like manner, the temperature sensor 206 outputs a raw analog temperature voltage signal which is converted to a digital temperature signal (Tadc).

During calibration, the test system 108 applies a known pressure stimulus and records the value of the actual applied pressure (Pact). Simultaneously, the test system 108 sends a command to control logic 212 that causes the die 104 to report the current Padc and Tadc values to the test system 108. The test system 108 records these values. This process is repeated at a variety of predetermined pressures and temperatures. When the test system 108 has gathered all the required data, test system 108 uses the collected data to 108 calculate the coefficients, then writes the coefficients to coefficient storage unit 214 where they remain available for future use by transfer function circuitry 210.

Note that the functions performed by test system 108 can be implemented in whole or part in control logic 212 to provide a self-contained sensor system capable of generating calibration data without requiring an external test system 108.

Performing calibration tests at multiple temperatures without including temperature control circuit 204 and temperature sensor 206 on transducer die 102 requires multiple insertions in test system 108 since test system 108 is not capable of changing temperatures very quickly. Many thousands of devices are tested at a single temperature, the test system 108 temperature is changed to then next temperature and all the devices are tested again at the new temperature. Each insertion adds test time and cost. In contrast, sensor system 100 can change temperatures of the transducer die 102 while sensor system 100 remains in the environmental test chamber, allowing calibration and test to be completed in a more efficient manner.

When sensor system 100 is in regular operational use, Padc and Tadc are supplied to transfer function circuitry 210, and the transfer function circuitry 210 performs a series of mathematical operations on the Padc and Tadc values using the coefficients stored at calibration to provide a calibrated pressure (Pcomp) output.

Figure 3:
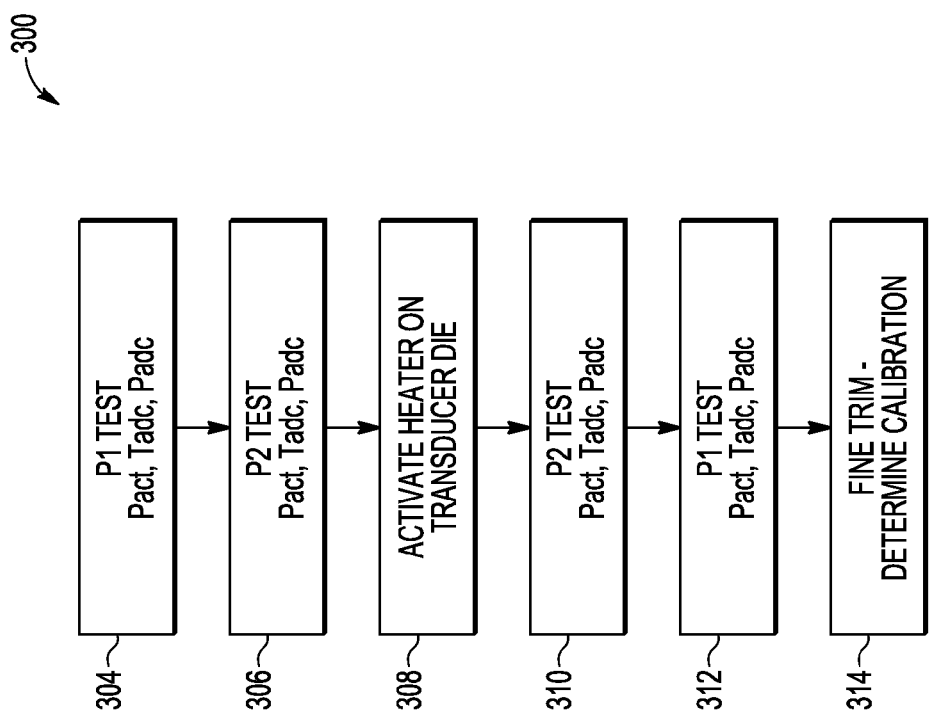
FIG. 3 shows an embodiment of a method for calibrating a sensor system that is used to sense pressure.

Referring to FIGS. 2 and 3, FIG. 3 shows an embodiment of a method 300 for calibrating sensor system 100 that is used to sense pressure, however method 300 can be adapted to be used with a sensor system that measures other parameters.

Process 304 can include placing sensor system package 106 in an environmental test chamber or in an ambient environment at a first temperature and pressure and taking measurements of the actual pressure, actual temperature, sensed (raw, uncalibrated) temperature (from temperature sensor 206), and sensed pressure signals (raw, uncalibrated) from transducer 202. The raw, uncalibrated analog pressure and temperature signals from the transducer die are converted to digital signals and provided to test system 108 via control logic 212.

Process 306 can include adjusting the pressure in the environmental test chamber while leaving the temperature unchanged, and again taking measurements of the actual pressure, actual temperature, sensed (raw, uncalibrated) temperature (from temperature sensor 206), and sensed pressure signals (raw, uncalibrated) from transducer 202. The raw, uncalibrated analog pressure and temperature signals from the transducer die are converted to digital signals and provided to test system 108 via control logic 212.

Process 308 can include activating temperature control element 204 on transducer die 102 and waiting until at least a portion of transducer die 102 reaches a steady state temperature. The temperature control element 204 can include a control input that is coupled to be activated by test system 108, control circuitry 212, or an external control source (not shown). Other suitable techniques for activating temperature control element 204 can be used depending on the type of temperature control element 204 used.

Process 310 can include leaving the pressure the same as the pressure used in process 306, and again taking measurements of the actual pressure, actual temperature, sensed (raw, uncalibrated) temperature (from temperature sensor 206), and sensed pressure signals (raw, uncalibrated) from transducer 202 while at least a portion of transducer die 102 is at the second temperature. In other embodiments, the pressure can be changed along with the temperature. The raw, uncalibrated analog pressure and temperature signals from the transducer die are converted to digital signals and provided to test system 108 via control logic 212.

Process 312 can include allowing sensor system package 106 to remain in the environmental test chamber and adjusting the pressure in the environmental test chamber while leaving the temperature unchanged. Measurements can then be taken of the actual pressure, actual temperature, sensed (raw, uncalibrated) temperature (from temperature sensor 206), and sensed pressure signals (raw, uncalibrated) from transducer 202. Note data from more than one pressure at either temperature may not be needed. While the example shown uses two temperatures and two pressures at each temperature, it may be possible to generate the calibration data using only one pressure at each temperature rather than two pressures. The raw, uncalibrated analog pressure and temperature signals from the transducer die are converted to digital signals and provided to test system 108 via control logic 212.

Process 314 can include performing a fine trim procedure to determine calibration coefficients and/or offsets for correcting the sensor data output by output circuitry die 104. The fine trim process can use the pressure and temperature measurements at the trim points to determine transfer function coefficients and/or offsets to be used to correct the output of sensor system 100 during various operating conditions. The coefficients and/or offsets can be sent to and stored in coefficient storage unit 214 and used by transfer function circuitry 210 during operation of the components in package 106. Test system 108 can then be disconnected from package 106.

In the past, two or more temperature insertions in an environmental test chamber were required to perform temperature calibration of a sensor device. Adding a heater element and a temperature sensor on the transducer die of a 2-die sensor system allows calibration data to be taken at one temperature (likely room temperature). Current is then run through the heater element and the temperature sensor is monitored until the desired stable temperature is reached. At this time data can be taken at elevated temperature without an additional test insertion.

In some embodiments, there has been provided a multi-die sensor system comprises a package and a transducer die mounted in the package. The transducer die can include a transducer and a temperature control element. The temperature control element can change the temperature of at least a portion of the transducer during operation of the temperature control element. A temperature sensor can sense the temperature of at least the portion of the transducer. An output circuitry die mounted in the package can receive transducer signals and a sensed temperature signal from the temperature sensor.

In a further aspect, a control module configured to receive the transducer signal and the sensed temperature signal from the transducer die.

In another aspect, a transfer function module configured to receive signals from the control module and a coefficient storage module.

In another aspect, a conversion module configured to receive the transducer signals from the transducer die.

In another aspect, a coefficient storage module can be configured to provide calibration coefficients to a transfer function circuit.

In another aspect, the temperature control element can be configured to receive a control signal to operate the temperature control element.

In another aspect, a test system can be coupled to communicate with the package and configured to use data measured at the trim points to determine calibration data for the transducer.

In other embodiments, a method for calibrating a sensor system can include exposing the package to a measurable condition and a first temperature; collecting data on the measurable condition from the transducer and first temperature data from the temperature sensor; activating the temperature control element to change at least a portion of the transducer die to a second temperature; collecting data on the measurable condition from the transducer while at the second temperature; and generating calibration data for the transducer based on the data collected at the measurable condition and the first and second temperatures. The sensor system includes a transducer die and an output circuitry die mounted in a package. The transducer die includes a temperature control element and a temperature sensor, and the output circuitry die includes signal processing components.

In another aspect, the method can include sending the data at the first and second measurable conditions and the first and second temperatures to a control circuit on the output circuitry die.

In another aspect, the method can include calculating trim coefficients using the calibration data.

In another aspect, the method can include signal conditioning of the signals from the transducer; and providing the conditioned signals to transfer function circuitry on the output circuitry die.

In another aspect, the method can include storing the calibration data in a coefficient storage module on the output circuitry die.

In another aspect, the method can include sending a control signal to operate the temperature control element.

In another aspect, the method can include sending the data at the first and second measurable conditions and the first and second temperatures to a test system coupled to communicate with the package; generating the calibration data in the test system; and sending the calibration data from the test system to the package.

In other embodiments, a multi-die sensor system can comprise a package and a transducer die mounted in the package. The transducer die includes a transducer, a temperature control element, and a temperature sensor. The temperature control element changes the temperature of at least a portion of the transducer during operation of the temperature control element. A temperature sensor can be configured to sense the temperature of at least the portion of the transducer. An output circuitry die mounted in the package can be coupled to receive transducer signals and sensed temperature signals from the temperature sensor. The transducer signals include first and second measurable condition signals and the temperature signals include first and second temperature signals. Calibration data generated using the first and second measurable condition signals and the first and second temperature signals are stored on the output circuitry die and are used to correct the signals from the transducer die.

In another aspect, a control module is configured to receive the transducer signals and the sensed temperature signals from the transducer die. A transfer function can be configured to receive signals from the control module and a coefficient storage module.

In another aspect, the temperature control element and the temperature sensor can be implemented using one component.

In another aspect, a conversion module configured to condition the signals from the transducer die.

In another aspect, a coefficient storage module configured to provide the calibration data to a transfer function circuit on the output circuitry die.

In another aspect, the temperature control element can be configured to receive a control signal to operate the temperature control element.

Because the apparatus implementing the present disclosure is, for the most part, composed of electronic components, modules, and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In some embodiments, test system 108 can be implemented in a computer system. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A multi-die sensor system comprising:
   a package;
   one or more transducer dies mounted in the package, each transducer die including a transducer;
      a temperature control element, wherein the temperature control element changes the temperature of at least a portion of the transducer during operation of the temperature control element; and
      a temperature sensor configured to sense the temperature of at least the portion of the transducer;
   an output circuitry die mounted in the package, the output circuit die coupled to receive transducer signals and a sensed temperature signal from the temperature sensor;
   a coefficient storage module configured to provide calibration coefficients to a transfer function module.

2. The system of claim 1 further comprising:
   a conversion module configured to receive the transducer signals from the transducer die.

3. The system of claim 1 wherein the temperature control element is configured to receive a control signal to operate the temperature control element.

4. The system of claim 1 further comprising:
   a test system coupled to communicate with the package and configured to use data measured at trim points to determine calibration data for the transducer.

5. The system of claim 1 further comprising:
   a control module configured to receive the transducer signal and the sensed temperature signal from the transducer die.

6. The system of claim 5 further comprising:
   a transfer function module configured to receive signals from the control module and a coefficient storage module.

7. A multi-die sensor system comprising:
   a package;
   one or more transducer dies mounted in the package, each transducer die including one or more transducers;
      a temperature control element, wherein the temperature control element changes the temperature of at least a portion of the transducer die during operation of the temperature control element; and
      a temperature sensor configured to sense the temperature of at least the portion of the transducer; and
   an output circuitry die mounted in the package, the output circuit die coupled to receive transducer signals and sensed temperature signals from the temperature sensor, wherein the transducer signals include first and second measurable condition signals and the temperature signals include first and second temperature signals, further wherein calibration data generated using the first and second measurable condition signals and the first and second temperature signals are stored on the output circuitry die and are used to correct the signals from the transducer die.

8. The system of claim 7 further comprising:
a conversion module configured to condition the transducer signals from the transducer die.

9. The system of claim 7 further comprising:
a coefficient storage module configured to provide the calibration data to a transfer function module on the output circuitry die.

10. The system of claim 7 wherein the temperature control element is configured to receive a control signal to operate the temperature control element.

11. The system of claim 7 further comprising:
a control module configured to receive the transducer signals and the sensed temperature signals from the transducer die; and
a transfer function module configured to receive signals from the control module and a coefficient storage module.

12. The system of claim 11 wherein:
the temperature control element and the temperature sensor are implemented using one component.

13. A sensor system comprising
a transducer die and an output circuitry die mounted in a package, the transducer die includes a temperature control element and a temperature sensor, and the output circuitry die includes signal processing components;
a temperature control element configured to expose the package to a measurable condition, a first temperature, and a second temperature;
the signal processing components receive data on the measurable condition from the transducer and first and second temperature data from the temperature sensor and generate calibration data for the transducer based on the data collected at the measurable condition and the first and second temperatures.

14. The sensor system of claim 13 wherein:
the calibration data is used to calibrate signals from the transducer.

15. The sensor system of claim 13 further comprising:
a transfer function module on the output circuitry die;
a conversion module configured to condition transducer signals from the transducer die;
and provide the conditioned signals to the transfer function module.

16. The sensor system of claim 13 wherein:
the calibration data is stored in a coefficient storage module on the output circuitry die.

17. The sensor system of claim 13 further comprising:
a control module configured to receive the data at the first and second measurable conditions and the first and second temperatures.

18. The sensor system of claim 17 wherein the control module is configured to send a control signal to operate the temperature control element.

19. The sensor system of claim 17 wherein the output circuitry die is configured to:
send the data at the first and second measurable conditions and the first and second temperatures to a test system coupled to communicate with the package.

* * * * *